US011934655B2

United States Patent
Ye

(10) Patent No.: US 11,934,655 B2
(45) Date of Patent: Mar. 19, 2024

(54) SYSTEMS AND METHODS FOR A LOG PARTITIONER SERVICE

(71) Applicant: Salesforce, Inc., San Francisco, CA (US)

(72) Inventor: Lei Ye, Bellevue, WA (US)

(73) Assignee: Salesforce, Inc.

( * ) Notice: Subject to any disclaimer, the term of this patent is extended or adjusted under 35 U.S.C. 154(b) by 145 days.

(21) Appl. No.: 17/656,827

(22) Filed: Mar. 28, 2022

(65) Prior Publication Data

US 2023/0305698 A1    Sep. 28, 2023

(51) Int. Cl.
*G06F 16/00* (2019.01)
*G06F 3/06* (2006.01)

(52) U.S. Cl.
CPC .......... *G06F 3/0604* (2013.01); *G06F 3/0644* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |

(Continued)

OTHER PUBLICATIONS

Amazon Simple Storage Service: User Guide, API Version Mar. 1, 2006 (Year: 2006).*

*Primary Examiner* — Hasanul Mobin
(74) *Attorney, Agent, or Firm* — Lorenz & Kopf, LLP

(57) ABSTRACT

A system for storing multiple petabytes of raw log data from cloud-based source data buckets into internal partitioned data storage in a data lake is provided. The system is configured to: deploy a log partitioner cluster comprising a plurality of log partitioner service instances for storing the raw log data in a partitioned manner; associate one or more of the source data buckets to each of a plurality of deployed log partitioner service instances by providing associated configuration metadata from a configuration service; fetch, via the log partitioner cluster, raw log data from associated source data buckets based on the associated configuration metadata, wherein the associated configuration metadata provides instructions for use by a log partitioner service instance to onboard raw log data; and place fetched raw log data, via the log partitioner cluster, in the internal partitioned log storage in accordance with the associated configuration metadata.

20 Claims, 5 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,363,457 B1 * | 4/2008 | Dekoning ............. G06F 3/0607 711/170 |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0161564 A1 * | 6/2010 | Lee ..................... G06F 11/2028 707/674 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 * | 9/2013 | Cinarkaya ........... G06F 16/9535 709/213 |
| 2018/0101589 A1 * | 4/2018 | Shi ....................... G06F 16/2358 |
| 2020/0285737 A1 * | 9/2020 | Kraus ................... G06F 21/552 |
| 2020/0326991 A1 * | 10/2020 | Carroll ................. G06F 9/5083 |
| 2020/0334231 A1 * | 10/2020 | Muralidhar ............. G06F 3/067 |
| 2022/0188439 A1 * | 6/2022 | Drapeau ............... G06F 16/162 |

* cited by examiner

SYSTEMS AND METHODS FOR A LOG PARTITIONER SERVICE

TECHNICAL FIELD

Embodiments of the subject matter described herein relate generally to data ingestion to cloud-based data storage, and more particularly to systems and methods for data ingestion of log data to cloud-based data storage.

BACKGROUND

A log is a record of the events occurring within an organization's systems and networks. Logs are composed of log entries; each entry contains information related to a specific event that has occurred within a system or network. Many logs within an organization contain records related to computer security. These computer security logs are generated by many sources, including security software, such as antivirus software, firewalls, and intrusion detection and prevention systems; operating systems on servers, workstations, and networking equipment; and applications.

The number, volume, and variety of computer security logs have increased greatly, which has led organizations to develop computer security log management systems, which aim at ensuring that computer security records are stored in sufficient detail for an appropriate period of time. Routine log analysis is beneficial for identifying security incidents, policy violations, fraudulent activity, and operational problems. Logs are also useful when performing auditing and forensic analysis, supporting internal investigations, establishing baselines, and identifying operational trends and long-term problems. Organizations also may store and analyze certain logs to comply with Federal legislation and regulations. Log storage can be complicated by several factors, including a high number of log sources; inconsistent log content, formats, and timestamps among sources; and increasingly large volumes of log data.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a cloud-based data repository system is provided. The data repository system includes internal partitioned data storage for storing multiple petabytes of log data; a data ingestion pipeline for use in ingesting multiple gigabytes of raw log data per second for storage in the internal partitioned data storage; a configuration service for providing configuration metadata regarding source data buckets from which the raw log data are retrieved; and a log partitioner service including a controller. The controller is configured to: deploy (e.g., instantiate) a log partitioner cluster including a plurality of log partitioner service instances for storing the raw log data in a partitioned manner for improved defensive security; and associate one or more of the source data buckets to each of a plurality of deployed log partitioner service instances, wherein to associate a log partitioner service instance the controller is configured to provide associated configuration metadata from the configuration service to a deployed log partitioner service instance to initiate the log partitioner service instance; wherein each log partitioner service instance is configured to fetch raw log data from associated source data buckets based on the associated configuration metadata provided to the log partitioner service instance; wherein the associated configuration metadata provides instructions for use by a log partitioner service instance to onboard raw log data and place log data to destination storage on defined paths; and wherein each log partitioner service instance is configured to place fetched raw log data in the internal partitioned log storage in accordance with the instructions provided in its associated configuration metadata.

In another embodiment, a processor-implemented method for storing multiple petabytes of raw log data from cloud-based source data buckets into internal partitioned data storage in a data lake is provided. The method includes: deploying a log partitioner cluster including a plurality of log partitioner service instances for storing the raw log data in a partitioned manner; associating one or more of the source data buckets to each of a plurality of deployed log partitioner service instances, the associating including providing associated configuration metadata from a configuration service to a deployed log partitioner service instance to initiate the log partitioner service instance; fetching, via the log partitioner cluster, raw log data from associated source data buckets based on the associated configuration metadata provided to the log partitioner service instances; wherein the associated configuration metadata provides instructions for use by a log partitioner service instance to onboard raw log data and place log data to destination storage on defined paths; and placing fetched raw log data, via the log partitioner cluster, in the internal partitioned log storage in accordance with the instructions provided in associated configuration metadata.

In another embodiment, a non-transitory computer readable medium encoded with programming instructions configurable to cause a processor to perform a method for storing multiple petabytes of raw log data from cloud-based source data buckets into internal partitioned data storage in a data lake is provide. The method includes: deploying a log partitioner cluster including a plurality of log partitioner service instances for storing the raw log data in a partitioned manner; associating one or more of the source data buckets to each of a plurality of deployed log partitioner service instances, the associating including providing associated configuration metadata from a configuration service to a deployed log partitioner service instance to initiate the log partitioner service instance; fetching, via the log partitioner cluster, raw log data from associated source data buckets based on the associated configuration metadata provided to the log partitioner service instances; wherein the associated configuration metadata provides instructions for use by a log partitioner service instance to onboard raw log data and place log data to destination storage on defined paths; and placing fetched raw log data, via the log partitioner cluster, in the internal partitioned log storage in accordance with the instructions provided in associated configuration metadata.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
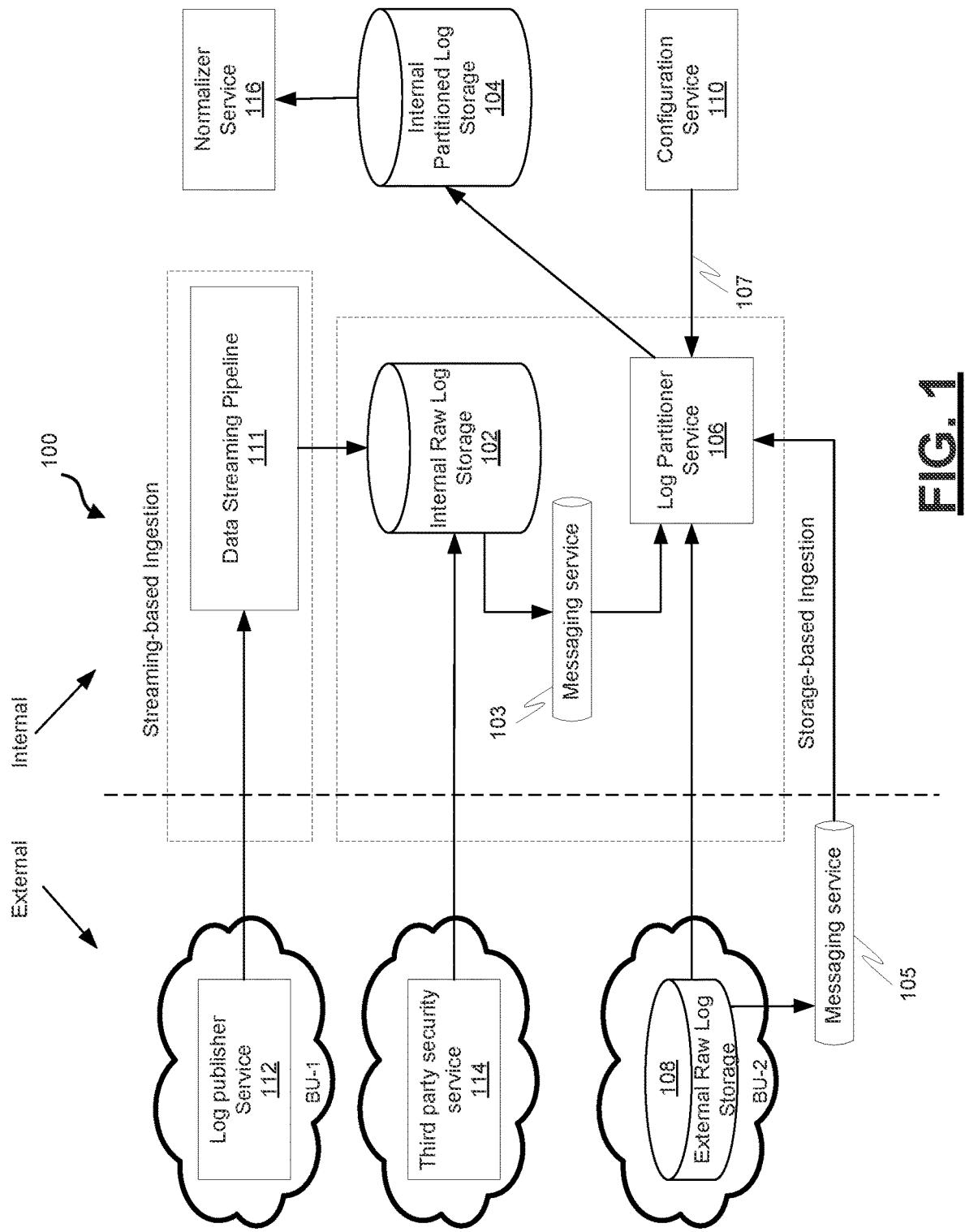
FIG. 1 is a block diagram depicting an example cloud-based data repository system configured to collect, analyze, search, and archive petabytes of log data, in accordance with some embodiments.

FIG. 1 is a block diagram depicting an example cloud-based data repository system 100 configured to collect, analyze, search, and archive petabytes of log data. The example system 100 includes internal raw log storage 102 for temporarily storing log data received through data streaming from external sources and internal partitioned log storage 104 for permanent storage of log data received from all external sources. The example system 100 further includes a log partitioner service 106 for fetching raw log data from raw log data storage and storing the log data in the partitioned log storage 104. The raw log data storage from which the log partitioner service 106 may fetch raw log data includes both the internal raw log data storage 102 and external raw log storage 108. The log partitioner service 106 is the log ingestion entry point for the example cloud-based data repository system 100. The log partitioner service 106 is configured to ingest hundreds of PB (petabyte) security log data to the example cloud-based data repository system 100. The example system 100 further includes a normalizer service 116 for retrieving partitioned log data from the internal partitioned log storage 104 and sending the retrieved partitioned log data to downstream services such as detection, analysis, etc.

The example cloud-based data repository system 100 provides for streaming-based data ingestion via a streaming-based data ingestion pipeline and storage-based data ingestion via a storage-based data ingestion pipeline. The streaming-based data ingestion pipeline may include a log publisher service streaming data service 111 (such as Apache Kafka) to stream raw log data (e.g., from a log publisher service 112) into the internal raw log storage 102. Also, a third party security service 114 (such as a CrowdStrike service) may be used to store raw log data into the internal raw log storage 102. In either case, when raw log data is stored in the internal raw log storage 102, a messaging service (such as SQS) generates a messaging notification 103 (e.g., a SQS message or notification) that informs the log partitioner service 106 that data is available in the internal raw log storage 102 for ingestion. The log partitioner service 106 is configured to fetch the raw data from the internal raw log data storage 102 based on information contained in the messaging notification 103 (e.g., SQS notification) and configuration metadata 107 received from a configuration service 110.

When raw log data is available for ingestion from external raw log storage (e.g., storage-based data ingestion via a data pipeline between the external raw log storage and the log partitioner service 106), a messaging service (such as SQS) generates a messaging notification 105 (e.g., a SQS notification) that informs the log partitioner service 106 that data is available in the external raw log storage 108 for ingestion. The log partitioner service 106 is configured to fetch the raw data from the external raw log data storage 108 based on information contained in the messaging notification 105 and configuration metadata 107 received from a configuration service 110.

The configuration metadata 107 instructs the log partitioner service 106 on where/when/how to onboard raw log data and place the raw log data in the internal partitioned log storage 104. In particular, the configuration metadata instructs the log partitioner service 106 on what to fetch from the external raw log storage 108 and how to format the data to store it in the partitioned log storage 104. Also, the configuration metadata 107 instructs the log partitioner service 106 on what to fetch from the internal raw log storage 102 and how to format the data to store it in the partitioned log storage 104.

The example log partitioner service 106 is implemented using a controller comprising at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

In an example operating scenario, the example log partitioner service 106 attaches to a source log storage 102 or 108 (e.g., AWS S3 bucket) and listens for messaging notifications for incoming new data. For example, a third party security service 114 may drop a new batch of raw log data in a current source bucket in internal raw log storage 102. Then a messaging notification 103 (e.g., SQS notification) will be sent to the log partitioner service 106 that will handle the batch by downloading all *.gz files for the batch and outputting the log files under a defined prefix in internal partitioned log storage 104.

The example log partitioner service 106 is implemented by bootstrapping one or more instances of the log partitioner service software. An instance of the log partitioner service 106 is bootstrapped with configuration metadata 107 stored in Configuration Service 110 for the source bucket (e.g., in internal raw log storage 102 or external raw log storage 108). This allows different log partitioner instances to handle different cloud storage elements (e.g., source buckets). This also allows the resources for implementing the log partitioner service 106 to be scaled up as needed. As used herein, a bucket is a container for storing objects.

Bootstrapping an instance of the log partitioner service 106 involves associating one or more source buckets (e.g., S3 buckets) with a deployed log partitioner service. The association of a source bucket is accomplished by a piece of metadata that is used to initiate a log partitioner. A messaging notification is enabled for every source bucket and triggers a notification on log partitioner service when a new log object is uploaded and present for consumption. In an example, SNS (Simple Notification Service) is a managed service that provides message delivery from publishers to subscribers (also known as producers and consumers). Publishers communicate asynchronously with subscribers by sending messages to a topic, which is a logical access point and communication channel. Clients can subscribe to the SNS topic and receive published messages using a supported endpoint type, such as SQS.

The configuration metadata is dynamic and stored with the configuration service 110. The configuration service 110 provides a read API for log partitioner service instances to use to retrieve corresponding metadata The configuration service 110 also provides other APIs, like Create/Update/Delete, that provide a mechanism to modify source bucket association information (aka storage specification) to dynamically control the behavior of log partitioner service instances. Additionally, the configuration service 110 provides a mechanism for recording metadata on where/when/how raw log data is onboarded and placed in a destination location (e.g., partitioned log storage 104).

The example cloud-based data repository system 100 includes two types of modes in which log partitioner service instances are associated with raw log storage. In the first mode, isolated mode, each log partitioner service instance attaches to one or more unique raw log storage buckets and partitions retrieved log data is a distinct manner. In the second mode, shared mode, multiple log partition instances are peers and collaborate to handle log partitioning work for a plurality of shared log storage buckets.

Figure 2:
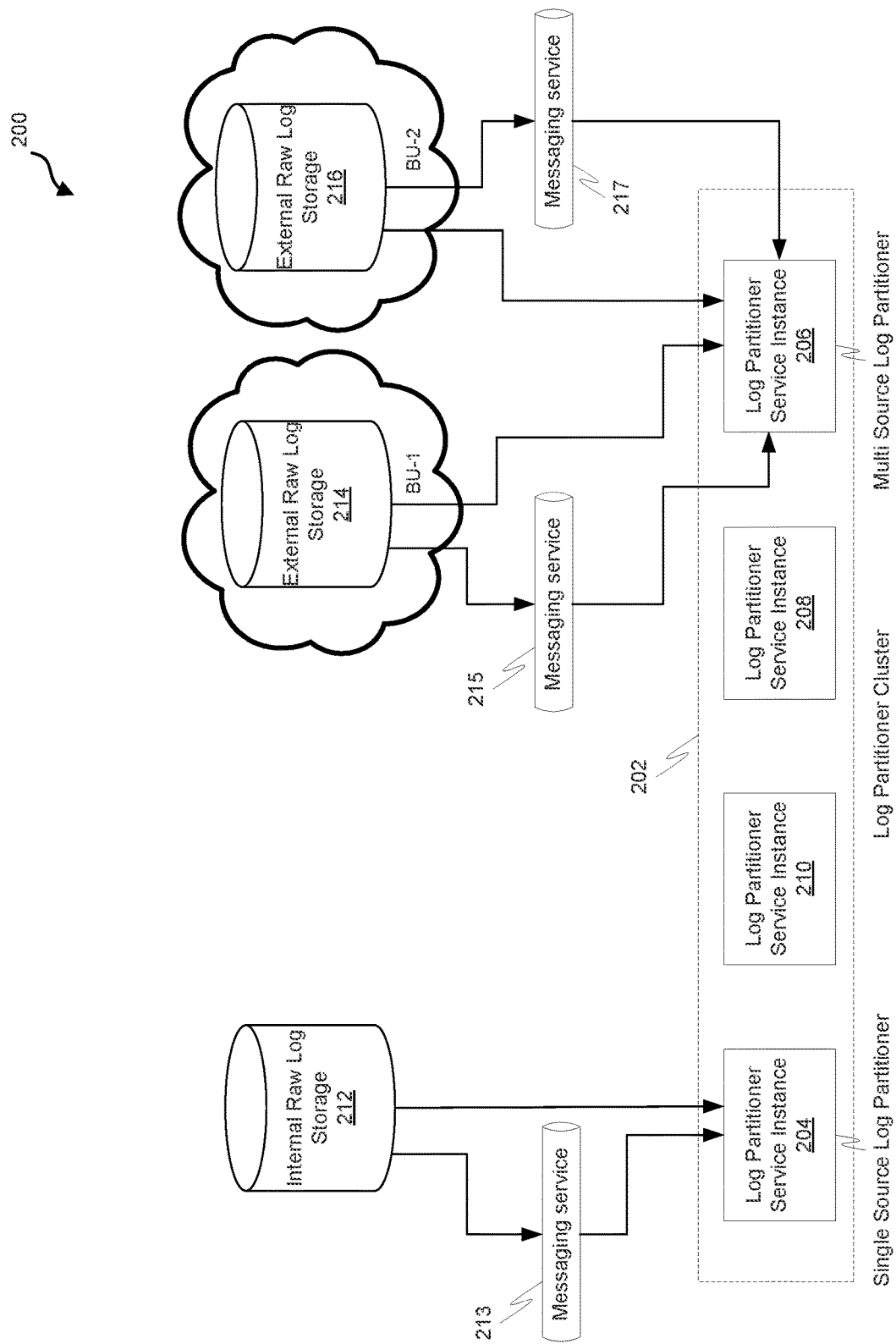
FIG. 2 is a block diagram of an example system wherein a plurality of log partition instances are bootstrapped in an isolated mode, in accordance with some embodiments.
Figure 3:
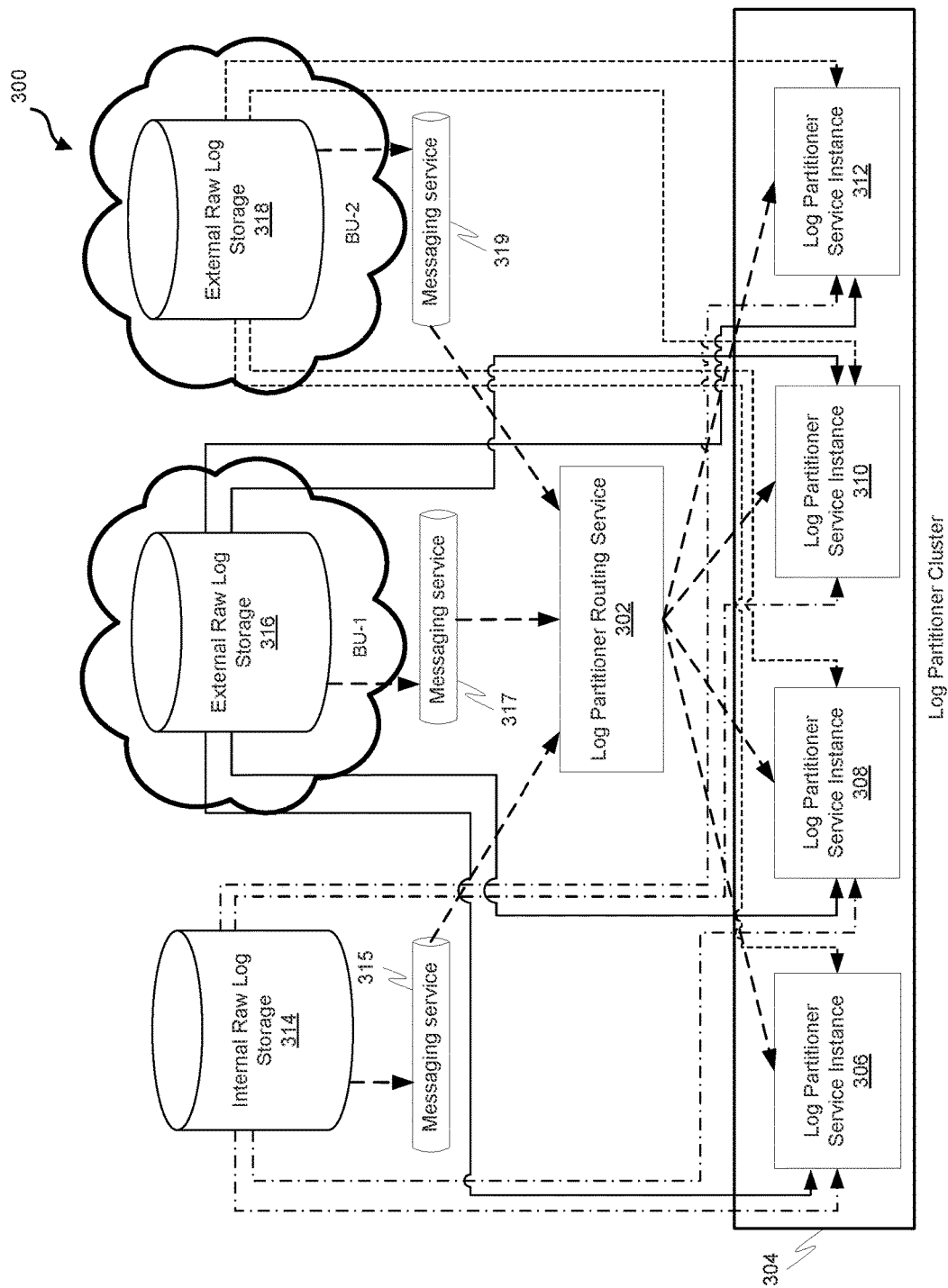
FIG. 3 is a block diagram of an example system wherein a plurality of log partition instances are bootstrapped in a shared mode, in accordance with some embodiments.

FIG. 2 is a block diagram of an example system 200 wherein a plurality of log partition instances are bootstrapped in an isolated mode. FIG. 3 is a block diagram of an example system 300 wherein a plurality of log partition instances are bootstrapped in a shared mode.

With reference to FIG. 2, the example system 200 includes a log partitioner service cluster 202 that includes four log partitioner service instances 204, 206, 208, 210. In this example, a first log partitioner service instance 204 is attached to an internal raw log storage element 212, and a second log partitioner service instance 206 is attached to both an external raw log storage element 214 and an external raw log storage element 216. The first log partitioner service instance 204 is configured as a single source log partitioner service and the second log partitioner service instance 206 is configured as a multiple source log partitioner service. In both cases, the first log partitioner service instance 204 and the second log partitioner service instance 206 are associated with unique raw log storage elements.

The first log partitioner service instance 204 receives messaging notifications from the messaging service 213, fetches data from the internal raw log storage element 212 in response to the received messaging notifications, and executes a partitioning task to store the fetched data in internal partitioned log data storage (e.g., internal partitioned raw log storage 104). The second log partitioner service instance 206 receives messaging notifications from the messaging services 215, 217, fetches data from the external raw log storage elements 214, 216 in response to the received messaging notifications, and executes a partitioning task to store the fetched data in the internal partitioned log data storage (e.g., internal partitioned raw log storage 104).

In this example, the single source log partitioner (first log partitioner service instance 204) is reserved to process dedicated log data and it utilizes isolated computation resources to execute the partitioning work. The multi-source log partitioner (second log partitioner service instance 206) provides a cost-effective solution for performing partitioning work when a single instance is not needed to service log data sources. The multi-source log partitioner utilizes multiplexing to perform partitioning work for multiple different log data sources. The multi-source log partitioner can be useful for processing multiple low throughput and low volume log data sources in parallel thereby decreasing the cost-to-serve (CTS).

With reference to FIG. 3, the example system 300 includes a log partitioner routing service 302 and a log partitioner service cluster 304 that includes four log partitioner service instances 306, 308, 310, 312. In this example, the four log partitioner instances 306, 308, 310, 312 are peers and work collaboratively to handle log partitioning work for all raw log storage elements 314, 316, 318. Each log partitioner instance 306, 308, 310, 312 is configured in the same configuration and is able to receive any notification from any source log storage element 314, 316, 318 (M:N mapping). The log partitioner routing service 302 is used to distribute messaging notifications. The log partitioner routing service 302 receives each messaging notification from the messaging services 315, 317, 319 and dispatches the notification to one of the four log partitioner instances 306, 308, 310, 312. When a log partitioner instance receives a notification, the log partitioner instance will fetch data from the appropriate raw log storage element and execute a partitioning task to store the fetched data in internal partitioned log data storage (e.g., internal partitioned raw log storage 104).

The log partitioner service (e.g., example log partitioner service 106, log partitioner instances 204, 206, 208, 210, and log partitioner instances 306, 308, 310, 312) stores log data in the destination storage (e.g., internal partitioned raw log storage 104) based on a partition key. The example partition key is devised based on multiple dimensions such as business unit (BU), source type, time, environment, etc. The partition key allows the log partitioner service to properly put log data in the correct path in the destination storage. Laying out data under the right path allows downstream services to pick up data and apply corresponding logic to process them further. An example partition key for log partitioner service may include the dimensions listed below:

DestinationStorageRoot/BU/SourceType/YYYY/MM/
DD/HH/Environment/HashGroup/

The example DestinationStorageRoot dimension identifies the destination location at which the log data is to be stored. The example BU dimension identifies the business unit that own the log data. The example SourceType dimension differentiates between types of log data, including event types from log data sources, such as CrowdStrike, osquery, etc., that have hundreds of event types.

The example Environment dimension describes where a BU collects a source type. A BU could collect the same source type across multiple environments. To differentiate different environments (e.g., cloud substrate), the environment dimension can be used in the partition key.

The example HashGroup dimension allows for smaller-sized storage units to be searched for partitioned log data. The HashGroup dimension can be used to cause log data to be stored in smaller-sized storage units. For cloud storage, like S3, putting all hourly log data under the same prefix may hit limits slowing down downstream services when consuming data by running an expensive distributed query. To further organize data in a reasonable amount under a prefix, the HashGroup dimension can be used to subgroup log data to improve the consumption experience. The HashGroup dimension can be made optional for logs that do not need it. The HashGroup dimension includes hash values computed via a hash function to partition a bunch of log files. The hash function can be defined per source type in terms of business requirements.

The example time key dimension may be represented as YYYY/MM/DD/HH and provides up to hour granularity to group log data. There are a number of time choices that can be used for the time key dimension. The lifecycle of raw log data includes (i) an event time—the moment when it is created and recorded in log lines, (ii) the storage time—the moment when log data is uploaded to cloud storage and persisted, (iii) the ingestion time—the moment when the log partitioner service ingests the log data; and (iv) the processing time—the moment when downstream services consume the partitioned log data for post processing. At each phase, there is a timestamp that accompanies the log data.

The example log partitioner service uses the event time for the time key dimension when retrieving event time is computationally cheap and there is no significant performance impact. Unless the raw log storage has a well partitioned layout with a timestamp, retrieving event time can be computationally expensive because of computation spent on data scan and inspection. If the event time is not accessible or computationally expensive, the example log partitioner service may use the storage time for the time key dimension because it can be a rough estimate of event time.

The workload on the example log partitioner service is affected by the raw data layout and organization in the source log data storage. When the raw log data in a source bucket follows an expected partition key or uses a similar partition approach, the log partitioner service will have much less work to do but to pass the log data into a predefined destination bucket at a specific prefix/location. In contrast, when the source data is not partitioned or uses a special classification, the log partitioner service will have more complex work to do.

The log partitioner service can partition at least three types of raw log data—well-partitioned, semi-partitioned, and non-partitioned log data, which are illustrated in Table 1 below.

TABLE 1

| Log Partitioner Workload Based On 2-Dimension of Classification | | Partition Degree | | |
| --- | --- | --- | --- | --- |
| | | Well-Partitioned | Semi-Partitioned | Non-Partitioned |
| Embedded Schema in Data | Yes | Pass Through | Extract Partial Partition Keys | Extract All Partition Keys |
| | No | Pass Through | Parsing Data + Extract Partial Partition Keys | Parsing Data + Extract All Partition Keys |

To process semi-partitioned and non-partitioned data, the log partitioner service 106 is configured to extract partition keys from the log entries themselves. The raw log data can have different formats and may or may not contain a schema, which can make information extraction challenging. The source bucket's partition degree and embedded schema is contained in storage specification. The specification is a piece of metadata stored in the configuration service 110 used to bootstrap a log partitioner instance and to instruct the log partitioner instance on how to process data from the source bucket with an expected behavior. An example storage specification is provided below:

```
{
  # Storage Specification Schema Version
  "SpecSchemaVersion": "1",
  # Storage Specification Version
  "SpecVersion": "1",
  # Source Storage Name
  "SourceStorageName": "",
  # Source Storage URL
  "SourceStorageUrl": "",
  # Destination Storage Name
  "DestinationStorageName": "",
  # Destination Storage URL
  "DestinationStorageUrl": "",
  # Partition Rule Applied to A List of Source Prefix in Source Storage
  "PartitionRule": [
    {
      # Source Prefix Relative Path in Source Storage
      "SourcePrefix": "",
      # Partition Degree: Well-Partitioned, Semi-Partitioned, Non-Partitioned
      # If it is Well-Partitioned, all content below can bet empty
      "PartitionDegree": "",
      # Schema embedded in Data: true, false
      "EmbeddedSchema": true,
      # Business Unit, use "Extract" if BU is embedded in log data and specify BUField
      "BusinessUnit": "",
      "BUField": "",
      # Log Type
      "LogType": "",
      # Event Type (Nullable)
      "EventType": "",
      # Time used for Partition: EventTime, StorageTime
      "PartitionTime": "",
      # Event Time Field in Log Data, empty for StorageTime
      "TimeField": "",
      # Environment, use "Extract" if Environment is embedded in log data and specify
      "Environment": "",
      "EnvironmentField": "",
      # Hash Group, enum sets for hashing [None, Custom, Hash-1, Hash-2, ....]
      # None means no HashGroup in partition key
      # Custom means using existing hash group from source log storage and apply it
      # to destination storage
      # Hash-1, Hash-2, ... means pre-defined hash functions in log partitioner
      "HashGroup": "",
      # Optional. It is used to disassemble events from a mix of event log data.
      # For non-split events, they will use EventType by default
      "EventSplitRule":{
        # Event Field in Log Data
        "EventField": "",
        # Event Names to Be Split Out
        "EventName": [
        ]
      },
      # Optional. It needs parsing rule (e.g., regex) if EmbeddedSchema is false
      "ParsingRule": {
        # Parsing Rule Id
        "RuleId": "",
        # Parsing Rule Content
        "RuleContent": ""
      },
    }
  ]
}
```

The storage specification describes log data source and destination storage locations. For source storage, there are a series of partition rules.

Figure 4:
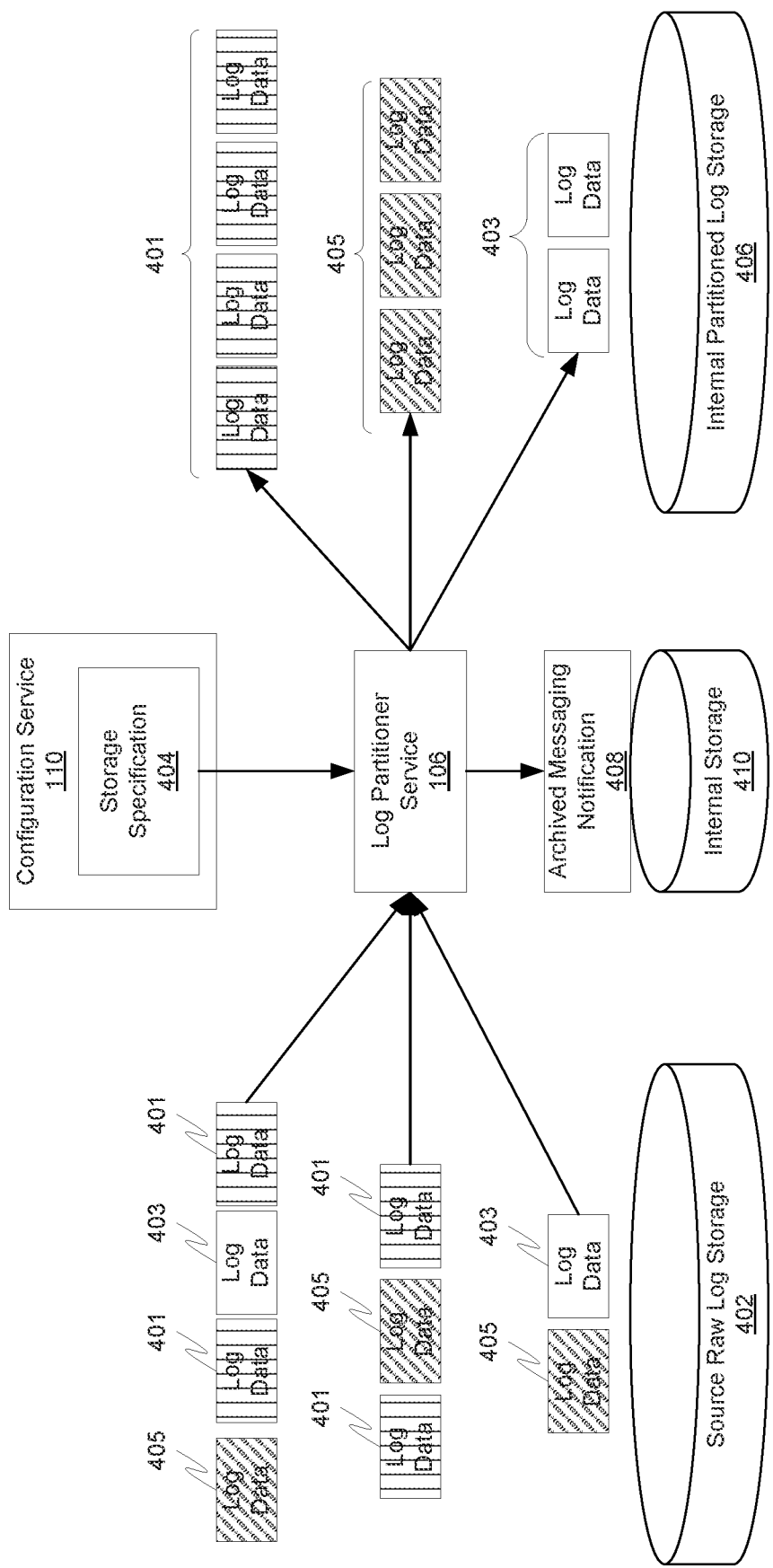
FIG. 4 is a flow diagram depicting an example log data flow using the example log partitioner service, in accordance with some embodiments.

FIG. 4 is a flow diagram depicting an example log data flow using the example log partitioner service 106. The log partitioner service 106 takes raw log data 401, 403, 405 from source log storage 402, utilizes a storage specification 404 to build a runtime partitioning engine and writes the log data to destination storage 406 (e.g., internal partitioned log storage 406) on defined paths. The example log partitioner service 106, utilizes an algorithm, similar to a MapReduce programming model, that uses functional-style transformation operations on streams of log data, for example in Java. A mapper will match log data using the partitioning engine and drop them into different buffers. Subsequently, a reducer will pack the log data in its listening buffer and write it to the destination storage 406. To bound the buffer resource, the example log partitioner service 106 can apply a time-based or size-based trigger over the memory buffers so that reducers can flush them into internal partitioned log storage 406 in time without risking system health.

In addition, the example log partitioner service 106 archives processed or failed messaging notifications 408 into internal storage 410 (e.g., S3, GCS, etc.). The archives can be replayed for multiple purposes, such as: (i) backfilling—the failed raw log data can be re-imported by a new log partitioner instance so that data ingestion is complete; (ii) regrouping—the data can be re-imported to a new destination storage according to an updated partition strategy to satisfy detection and investigation; and (iii) auditing—imported data can be monitored in the front so that the amount of log data that is ingested can be transparently understood.

Figure 5:
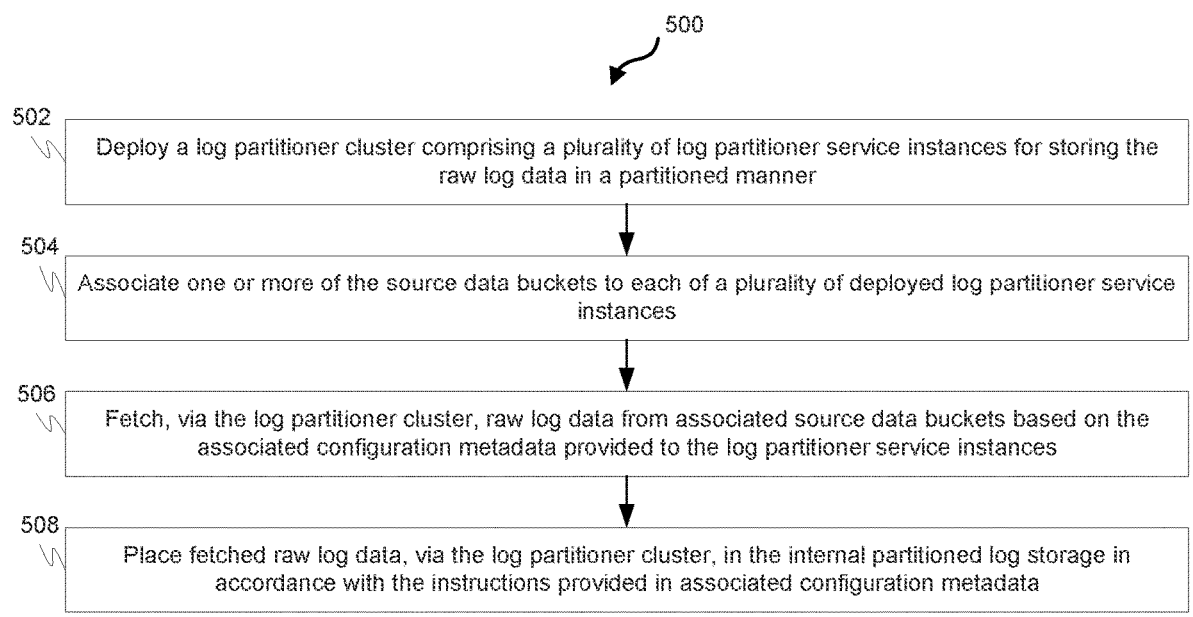
FIG. 5 is a process flow chart depicting an example processor-implemented method for storing multiple petabytes of raw log data from cloud-based source data buckets into internal partitioned data storage in a data lake, in accordance with some embodiments.

FIG. 5 is a process flow chart depicting an example processor-implemented method for storing multiple petabytes of raw log data from cloud-based source data buckets into internal partitioned data storage in a data lake. The order of operation within the example process 500 is not limited to the sequential execution as illustrated in the figure, but may be performed in one or more varying orders as applicable and in accordance with the present disclosure.

The example process 500 includes deploying a log partitioner cluster comprising a plurality of log partitioner service instances for storing the raw log data in a partitioned manner (operation 502). The log partitioner cluster may comprise a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster. At least one of the log partitioner service instances may comprise a single source log partitioner. At least one of the log partitioner service instances may comprise a multi-source log partitioner.

The log partitioner cluster may comprise a plurality of log partitioner service instances that are bootstrapped in a shared mode to work collaboratively to handle log partitioning work for a plurality of shared raw log storage elements, and deploying a log partitioner cluster may comprise: deploying a log partitioner routing service; receiving, via the log partitioner routing service, a notification that data is available in a source bucket; selecting, via the log partitioner routing service, one of the log partitioner service instances in the log partitioner cluster to service the notification; dispatching, via the log partitioner routing service, the notification to the selected log partitioner service instance; and fetching data from the appropriate source data bucket and executing a partitioning task to store the fetched data in the internal partitioned log storage, by the selected log partitioner instance after receiving the notification.

The example process 500 includes associating one or more of the source data buckets to each of a plurality of deployed log partitioner service instances (operation 504). The associating comprises providing associated configuration metadata from a configuration service to a deployed log partitioner service instance to initiate the log partitioner service instance. The associated configuration metadata provides instructions for use by a log partitioner service instance to onboard raw log data and place log data to destination storage on defined paths.

The example process 500 includes fetching, via the log partitioner cluster, raw log data from associated source data buckets based on the associated configuration metadata provided to the log partitioner service instances (operation 506) and placing fetched raw log data, via the log partitioner cluster, in the internal partitioned log storage in accordance with the instructions provided in associated configuration metadata (operation 508).

The placing fetched raw log data in the internal partitioned log storage may comprise placing, via the log partitioner cluster, the fetched raw log data in the internal partitioned log storage based on a partition key having a plurality of dimensions. The dimensions may comprise a destination storage root dimension, a source type dimension, a time key dimension, an environment dimension, and a hash group dimension. The time key dimension may be based on event time. The time key dimension may be based on storage time.

In one embodiment, a cloud-based data repository system is provided. The data repository system comprises internal partitioned data storage for storing multiple petabytes of log data; a data ingestion pipeline for use in ingesting multiple gigabytes of raw log data per second for storage in the internal partitioned data storage; a configuration service for providing configuration metadata regarding source data buckets from which the raw log data are retrieved; and a log partitioner service comprising a controller. The controller is configured to: deploy (e.g., instantiate) a log partitioner cluster comprising a plurality of log partitioner service instances for storing the raw log data in a partitioned manner for improved defensive security; and associate one or more of the source data buckets to each of a plurality of deployed log partitioner service instances, wherein to associate a log partitioner service instance the controller is configured to provide associated configuration metadata from the configuration service to a deployed log partitioner service instance to initiate the log partitioner service instance; wherein each log partitioner service instance is configured to fetch raw log data from associated source data buckets based on the associated configuration metadata provided to the log partitioner service instance; wherein the associated configuration metadata provides instructions for use by a log partitioner service instance to onboard raw log data and place log data to destination storage on defined paths; and wherein each log partitioner service instance is configured to place fetched raw log data in the internal partitioned log storage in accordance with the instructions provided in its associated configuration metadata.

These aspects and other embodiments include one or more of the following features. The data repository system may comprise a data lake. The data ingestion pipeline may comprise storage-based ingestion from source data buckets in external raw log storage. The system of claim 3, wherein the data ingestion pipeline may comprise streaming-based ingestion into one or more source data buckets in internal raw log storage using a real-time streaming data pipeline (e.g., Kafka). The log partitioner cluster may comprise a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster. At least one of the log partitioner service instances may comprise a single source log partitioner. At least one of the log partitioner service instances may comprise a multi-source log partitioner. The controller may be further configured to deploy a log partitioner routing service, the log partitioner cluster may comprise a plurality of log partitioner service instances that are bootstrapped in a shared mode to work collaboratively to handle log partitioning work for a plurality of shared raw log storage elements; the log partitioner routing service may be configured to receive a notification that data is available in a source bucket, select one of the log partitioner service instances in the log partitioner cluster to service the notification, and dispatch the notification to the selected log partitioner service instance; and when a selected log partitioner instance receives a notification, the selected log partitioner instance may be configured to fetch data from the appropriate source data bucket and execute a partitioning task to store the fetched data in the internal partitioned log storage. The cloud-based data repository system may further comprise internal message service storage and the log partitioner service is further configured to archive processed or failed messaging notification into the internal message service storage. The log partitioner service may be configured to place the fetched raw log data in the internal partitioned log storage based on a partition key having a plurality of dimensions, wherein the dimensions comprise a destination storage root dimension, a source type dimension, a time key dimension, an environment dimension, and a hash group dimension. The time key dimension may be based on event time. The time key dimension may be based on storage time. Associated configuration metadata may comprise source data bucket specific values for a partition key for fetched raw log data from a specific source data bucket.

In another embodiment, a processor-implemented method for storing multiple petabytes of raw log data from cloud-based source data buckets into internal partitioned data storage in a data lake is provided. The method comprises: deploying a log partitioner cluster comprising a plurality of log partitioner service instances for storing the raw log data in a partitioned manner; associating one or more of the source data buckets to each of a plurality of deployed log partitioner service instances, the associating comprising providing associated configuration metadata from a configuration service to a deployed log partitioner service instance to initiate the log partitioner service instance; fetching, via the log partitioner cluster, raw log data from associated source data buckets based on the associated configuration metadata provided to the log partitioner service instances; wherein the associated configuration metadata provides instructions for use by a log partitioner service instance to onboard raw log data and place log data to destination storage on defined paths; and placing fetched raw log data, via the log partitioner cluster, in the internal partitioned log storage in accordance with the instructions provided in associated configuration metadata.

These aspects and other embodiments may include one or more of the following features. The log partitioner cluster may comprise a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster. At least one of the log partitioner service instances may comprise a single source log partitioner. At least one of the log partitioner service instances may comprise a multi-source log partitioner. The log partitioner cluster may comprise a plurality of log partitioner service instances that are bootstrapped in a shared mode to work collaboratively to handle log partitioning work for a plurality of shared raw log storage elements, wherein the method may further comprise: deploying a log partitioner routing service; receiving, via the log partitioner routing service, a notification that data is available in a source bucket; selecting, via the log partitioner routing service, one of the log partitioner service instances in the log partitioner cluster to service the notification; dispatching, via the log partitioner routing service, the notification to the selected log partitioner service instance; and fetching data from the appropriate source data bucket and executing a partitioning task to store the fetched data in the internal partitioned log storage, by the selected log partitioner instance after receiving the notification. The method may further comprise placing, via the log partitioner cluster, the fetched raw log data in the internal partitioned log storage based on a partition key having a plurality of dimensions, wherein the dimensions comprise a destination storage root dimension, a source type dimension, a time key dimension, an environment dimension, and a hash group dimension.

In another embodiment, a non-transitory computer readable medium encoded with programming instructions configurable to cause a processor to perform a method for storing multiple petabytes of raw log data from cloud-based source data buckets into internal partitioned data storage in a data lake is provide. The method comprises: deploying a log partitioner cluster comprising a plurality of log partitioner service instances for storing the raw log data in a partitioned manner; associating one or more of the source data buckets to each of a plurality of deployed log partitioner service instances, the associating comprising providing associated configuration metadata from a configuration service to a deployed log partitioner service instance to initiate the log partitioner service instance; fetching, via the log partitioner cluster, raw log data from associated source data buckets based on the associated configuration metadata provided to the log partitioner service instances; wherein the associated configuration metadata provides instructions for use by a log partitioner service instance to onboard raw log data and place log data to destination storage on defined paths; and placing fetched raw log data, via the log partitioner cluster, in the internal partitioned log storage in accordance with the instructions provided in associated configuration metadata.

These aspects and other embodiments may include one or more of the following features. The log partitioner cluster may comprise a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster. At least one of the log partitioner service instances may comprise a single source log partitioner. At least one of the log partitioner service instances may comprise a multi-source log partitioner. The log partitioner cluster may comprise a plurality of log partitioner service instances that are bootstrapped in a shared mode to work collaboratively to handle log partitioning work for a plurality of shared raw log storage elements, wherein the method may further comprise: deploying a log partitioner routing service; receiving, via the log partitioner routing service, a notification that data is available in a source bucket; selecting, via the log partitioner routing service, one of the log partitioner service instances in the log partitioner cluster to service the notification; dispatching, via the log partitioner routing service, the notification to the selected log partitioner service instance; and fetching data from the appropriate source data bucket and executing a partitioning task to store the fetched data in the internal partitioned log storage, by the selected log partitioner instance after receiving the notification. The method may further comprise placing, via the log partitioner cluster, the fetched raw log data in the internal partitioned log storage based on a partition key having a plurality of dimensions, wherein the dimensions comprise a destination storage root dimension, a source type dimension, a time key dimension, an environment dimension, and a hash group dimension.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A cloud-based data repository system, the data repository system comprising:

memory;

at least one processor;

internal partitioned data storage for storing multiple petabytes of log data;

a data ingestion pipeline for use in ingesting multiple gigabytes of raw log data per second for storage in the internal partitioned data storage;

a configuration service for providing configuration metadata regarding source data buckets from which the raw log data are retrieved; and a log partitioner service comprising a controller configured to:

deploy a log partitioner cluster comprising a plurality of log partitioner service instances for storing the raw log data in a partitioned manner; and associate one or more of the source data buckets to each of a plurality of deployed log partitioner service instances, wherein to associate a log partitioner service instance the controller is configured to provide associated configuration metadata from the configuration service to a deployed log partitioner service instance to initiate the log partitioner service instance;

wherein each log partitioner service instance is configured to fetch raw log data from associated source data buckets based on the associated configuration metadata provided to the log partitioner service instance, wherein associated configuration metadata comprises source data bucket specific values for a partition key for fetched raw log data from a specific source data bucket;

wherein the associated configuration metadata provides instructions for use by a log partitioner service instance to onboard raw log data and place log data to destination storage on defined paths; and wherein each log partitioner service instance is configured to place fetched raw log data in the internal partitioned log storage based on the partition key having a plurality of dimensions, wherein the dimensions comprise one or more of a destination storage root dimension, a source type dimension, a time key dimension, an environment dimension, and a hash group dimension.

2. The system of claim 1, wherein the data repository system comprises a data lake.

3. The system of claim 1, wherein the data ingestion pipeline comprises storage-based ingestion from source data buckets in external raw log storage.

4. The system of claim 3, wherein the data ingestion pipeline comprises streaming-based ingestion into one or more source data buckets in internal raw log storage using a real-time streaming data pipeline.

5. The system of claim 1, wherein the log partitioner cluster comprises a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster.

6. The system of claim 5, wherein at least one of the log partitioner service instances comprises a single source log partitioner.

7. The system of claim 5, wherein at least one of the log partitioner service instances comprises a multi-source log partitioner.

8. The system of claim 1, wherein:
the controller is further configured to deploy a log partitioner routing service;
the log partitioner cluster comprises a plurality of log partitioner service instances that are bootstrapped in a shared mode to work collaboratively to handle log partitioning work for a plurality of shared raw log storage elements;
the log partitioner routing service is configured to receive a notification that data is available in a source bucket, select one of the log partitioner service instances in the log partitioner cluster to service the notification, and dispatch the notification to the selected log partitioner service instance; and
when a selected log partitioner instance receives a notification, the selected log partitioner instance is configured to fetch data from an appropriate source data bucket and execute a partitioning task to store the fetched data in the internal partitioned log storage.

9. The system of claim 1, wherein the cloud-based data repository system further comprises internal message service storage and the log partitioner service is further configured to archive processed or failed messaging notification into the internal message service storage.

10. The system of claim 1, wherein the dimensions comprise a destination storage root dimension, a source type dimension, a time key dimension, an environment dimension, and a hash group dimension.

11. The system of claim 10, wherein the time key dimension is based on event time.

12. The system of claim 10, wherein the time key dimension is based on storage time.

13. A processor-implemented method for storing multiple petabytes of raw log data from cloud-based source data buckets into internal partitioned data storage in a data lake, the method comprising:

deploying a log partitioner cluster comprising a plurality of log partitioner service instances for storing the raw log data in a partitioned manner;
associating one or more of the source data buckets to each of a plurality of deployed log partitioner service instances, the associating comprising providing associated configuration metadata from a configuration service to a deployed log partitioner service instance to initiate the log partitioner service instance;
fetching, via the log partitioner cluster, raw log data from associated source data buckets based on the associated configuration metadata provided to the log partitioner service instances, wherein associated configuration metadata comprises source data bucket specific values for a partition key for fetched raw log data from a specific source data bucket;
wherein the associated configuration metadata provides instructions for use by a log partitioner service instance to onboard raw log data and place log data to destination storage on defined paths; and
placing fetched raw log data, via the log partitioner cluster, in the internal partitioned log storage based on the partition key having a plurality of dimensions, wherein the dimensions comprise one or more of a destination storage root dimension, a source type dimension, a time key dimension, an environment dimension, and a hash group dimension.

14. The method of claim 13, wherein the log partitioner cluster comprises a plurality of log partitioner service instances that are bootstrapped in an isolated mode wherein each of the plurality of log partitioner service instances in the log partitioner cluster is associated with a source data bucket that is different from any source data bucket associated with another of the log partitioner service instances in the log partitioner cluster.

15. The method of claim 14, wherein at least one of the log partitioner service instances comprises a single source log partitioner.

16. The method of claim 14, wherein at least one of the log partitioner service instances comprises a multi-source log partitioner.

17. The method of claim 13, wherein the log partitioner cluster comprises a plurality of log partitioner service instances that are bootstrapped in a shared mode to work collaboratively to handle log partitioning work for a plurality of shared raw log storage elements, and further comprising:
deploying a log partitioner routing service;
receiving, via the log partitioner routing service, a notification that data is available in a source bucket;
selecting, via the log partitioner routing service, one of the log partitioner service instances in the log partitioner cluster to service the notification;
dispatching, via the log partitioner routing service, the notification to the selected log partitioner service instance; and
fetching data from an appropriate source data bucket and executing a partitioning task to store the fetched data in the internal partitioned log storage, by the selected log partitioner instance after receiving the notification.

18. The method of claim 13, wherein the dimensions comprise a destination storage root dimension, a source type dimension, a time key dimension, an environment dimension, and a hash group dimension.

19. A non-transitory computer readable medium encoded with programming instructions configurable to cause a processor to perform a method for storing multiple petabytes of raw log data from cloud-based source data buckets into internal partitioned data storage in a data lake, the method comprising:

deploying a log partitioner cluster comprising a plurality of log partitioner service instances for storing the raw log data in a partitioned manner;

associating one or more of the source data buckets to each of a plurality of deployed log partitioner service instances, the associating comprising providing associated configuration metadata from a configuration service to a deployed log partitioner service instance to initiate the log partitioner service instance;

fetching, via the log partitioner cluster, raw log data from associated source data buckets based on the associated configuration metadata provided to the log partitioner service instances, wherein associated configuration metadata comprises source data bucket specific values for a partition key for fetched raw log data from a specific source data bucket wherein the associated configuration metadata provides instructions for use by a log partitioner service instance to onboard raw log data and place log data to destination storage on defined paths; and placing fetched raw log data, via the log partitioner cluster, in the internal partitioned log storage based on the partition key having a plurality of dimensions, wherein the dimensions comprise one or more of a destination storage root dimension, a source type dimension, a time key dimension, an environment dimension, and a hash group dimension.

20. The method of claim 13, further comprising archiving a processed or failed messaging notification into internal message service storage.

* * * * *